United States Patent [19]
Fink et al.

[11] Patent Number: 5,953,533
[45] Date of Patent: Sep. 14, 1999

[54] COMPUTER SOFTWARE DISTRIBUTION, INSTALLATION AND MAINTENANCE METHOD AND APPARATUS

[75] Inventors: William M. Fink, Princeton Junction; Raymond K. Jones, Voorhees; Dexter E. Lopez, Piscataway, all of N.J.

[73] Assignee: Lucent Technologies Inc., Murray Hill, N.J.

[21] Appl. No.: 08/971,877

[22] Filed: Nov. 19, 1997

Related U.S. Application Data

[60] Provisional application No. 60/057,095, Aug. 27, 1997.

[51] Int. Cl.$^6$ ............................... G06F 9/445; H04L 9/00
[52] U.S. Cl. .................................................. 395/712; 380/4
[58] Field of Search ................................. 395/712; 380/4

[56] References Cited

U.S. PATENT DOCUMENTS

| | | | |
|---|---|---|---|
| 5,166,886 | 11/1992 | Molnar et al. | 364/479.04 |
| 5,555,416 | 9/1996 | Owens et al. | 395/712 |
| 5,579,479 | 11/1996 | Plum | 395/188.01 |
| 5,636,277 | 6/1997 | Nagahama | 380/4 |
| 5,636,346 | 6/1997 | Saxe | 705/1 |
| 5,646,992 | 7/1997 | Subler et al. | 380/4 |
| 5,668,992 | 9/1997 | Hammer et al. | 395/651 |
| 5,742,829 | 4/1998 | Davis et al. | 395/712 |
| 5,768,597 | 6/1998 | Simm | 395/712 |
| 5,790,796 | 8/1998 | Sadowsky | 395/200.51 |
| 5,805,891 | 9/1998 | Bizuneh et al. | 395/704 |
| 5,835,777 | 11/1998 | Staelin | 395/712 |
| 5,838,790 | 11/1998 | McAuliffe et al. | 380/4 |

OTHER PUBLICATIONS

"Software Distribution by CD–ROM Linked with Network"; IBM Technical Disclosure Bulletin; vol. 38, No. 11, pp. 111–112, Nov. 1995.

Mather, D.; "Automated Installations and Updating of Windows–Based Internet Applications at James Madison University"; Proceedings of the 23rd ACM SIGUCCS Conference on Winning the Networking Game; pp. 207–209, 1995.

"Table–Driven Selective Software Download"; IBM Technical Disclosure Bulletin; vol. 32, No. 9B, pp. 40–41, Feb. 1990.

*Primary Examiner*—Tariq R. Hafiz
*Assistant Examiner*—Brian Sattizahn
*Attorney, Agent, or Firm*—Jeffery J. Brosemer

[57] ABSTRACT

A computer software installation, distribution and maintenance method that manufactures one or more software products on an end user's target computer system. The method operates by generating a set of blueprints and raw materials for one or more software products to be distributed; provides the blueprints and raw materials to an end user; and manufactures the software products on the target computer according to the blueprints and using the raw materials. The method optionally provides for the testing of the target computer to determine its suitability for operating the software products, determines whether and updates to the software products are available and obtains them prior to manufacture; and tests and/or demonstrates the software products after manufacture.

9 Claims, 9 Drawing Sheets

FIG. 2A

ADDITIONAL FEATURES     220

- ALLOW THE END-USER TO DECIDE WHICH PRODUCTS TO MANUFACTURE.
- MARKETING PRODUCTS BY DISPLAYING ON – SCREEN ADVERTISEMENTS.
- INCORPORATING UTILITIES FOR TESTING AND/OR DEMONSTRATING THE PRODUCTS.
- TESTING AN END-USER'S SYSTEM TO DETERMINE WHETHER OR NOT IT MEETS PERFORMANCE REQUIREMENTS NECESSARY FOR USING THE PRODUCTS.
- PROMPTING END-USERS AT SOME TIME INTERVAL TO CONNECT TO THE WEBSITE TO RETRIEVE POSSIBLE UPGRADES.
- EL AL, FOR A COMPLETE LIST SEE INVENTION DISCLOSURE

COMPUTER SOFTWARE DISTRIBUTION, INSTALLATION AND MAINTENANCE METHOD AND APPARATUS

CROSS REFERENCE TO RELATED APPLICATION

This application claims the benefit of U.S. Provisional Application Ser. No. 60/057,095 filed Aug. 27, 1997.

TECHNICAL FIELD

This invention relates generally to the field of computer software and in particular to a method for the distribution, installation and maintenance of computer software.

BACKGROUND OF THE INVENTION

The easy and reliable distribution, installation and maintenance of software programs for use in computer systems, has been a problem that has forever plagued the software industry. Historically, when computer systems were relatively large, isolated systems shared by a number of users and a new software program was distributed, a human technician would travel to the computer system and install the appropriate program(s) and/or components necessary for the local operation software program on the computer system. In the event that its producer updated the software program, then a technician would again have to travel to the computer system and apply the update. Of course, the proliferation of computer workstations and personal computers has driven this method of distribution, installation and maintenance into obsolescence.

In particular, and as technology has improved, it has become commonplace for the producers of software programs to distribute their products on high-capacity media such as diskettes, or compact discs (CD). Oftentimes the software programs comprise a collection of independent modules that provide different functionality or serve to tailor the software program to a particular environment. By combining these modules in a particular manner, a tailored software program is assembled on the end user computer system that is generally specific to that system and the end user's requirements.

Unfortunately, many end users of software programs lack either the technical ability or desire or both to substantially contribute to the installation of a complex software program. As a result, the producers of the software programs have provided their products with installation programs that automate the software installation process sufficiently to permit an end-user of the software program to perform his/her own installation.

In operation, such an installation program will typically guide the end user through the installation process by querying the end user for specific functionality/components required in the end user software program. Typically, this query is performed by presenting the end user with a list of available or proposed components from which the end user makes one or more selections. Based upon the selection(s), the installation program assembles an end user software program from one or more of the components or modules.

Of course, the actual installation program can be quite complex even though many of its features are hidden from the end user. For example, an installation program can install applications, user preferences, system extensions, control panels and much more. Among its many capabilities, an installation program may: check to see whether a target computer meets minimum system requirements to permit an installation to continue; search for files or folders on a target disk; delete or move older or conflicting files; install files or folders; display a license agreement before starting the installation; display a "readme.txt" file after the installation is complete; and create an un-install program on the end user's computer.

Additionally, the components or modules associated with an installation are frequently distributed as compressed or encrypted (or both) files. Oftentimes such compressed/encrypted components are combined together in a package, i.e., as a single "self-extracting" executable program. When such a self-extracting program is run, it unpackages all of the components and de-crypts and decompresses them as appropriate. FIG. 1 shows in simplified block diagram form, this generalized software distribution and installation.

The primary aim of such an install program is to make installation of the software program simple, easy and straightforward. Oftentimes, comprehensive context-sensitive help is made available to the end user by the installation program. Additionally, once the software program is installed, the end user will often use the installation program to modify or update the software program at a later date.

Even this type of automated installation process is too often subject to errors. As noted previously, end users are oftentimes either disinterested or incapable of providing necessary responses to the installation program sufficient to produce a correct software program. More insidious, are inadvertent media errors in the component or modules provided by the software producer that may preclude their assembly into an operating software program. Additionally, even if the end user and installation program successfully assemble the components into an operational program, it oftentimes is not optimal for the end user computer system because of peculiarities associated with that system. Finally, any difficulties associated with the initial installation are often repeated during a likely update to the software program thereby compounding the problem.

Still more recently, the above methods and systems for installation and upgrading of end user software programs have been enhanced through the use of local area and wide area networking technologies. Specifically, local copies of program modules are frequently placed on a server connected to an end user computer system via local area or wide area (i.e., world-wide-web) protocols. In this manner, the end user frequently has access to a most recent copy/update to the software program, thereby facilitating its maintenance. Despite these improvements however, many of the above stated problems associated with the distribution, installation and maintenance of software still exist.

SUMMARY OF THE INVENTION

The above problems are overcome and advance is made over the prior art in accordance with the principles of the present invention directed to a method and apparatus for the distribution, installation and maintenance of computer software in which software programs are manufactured on a target computer. Advantageously, the manufactured programs are specific to a particular end user's needs and target system's capabilities, as opposed to merely being a program distributed as a fixed set of modules.

Viewed from one aspect, the present invention is directed to a method for the distribution, installation and maintenance of software programs on an end user's target computer system in which the software programs are manufactured on the target computer system. The method operates by generating a set of blueprints and raw materials for one or more software products to be distributed; delivers the blueprints and raw materials to an end user and, manufactures the software products on the target computer according to the blueprints and using the raw materials. The method optionally provides for the testing of the target computer to determine its suitability for operating the software products, determines whether any updates to the software products are available and obtains them prior to manufacture; and tests and/or demonstrates the software products after manufacture. Viewed from another aspect, the present invention is directed to an apparatus for providing the method, namely a "cyber factory" that performs the above method on the end user's target computer.

Further features and advantages of the present invention, as well as the structure and operation of various embodiments of the present invention are described in detail below with reference to the accompanying drawing.

BRIEF DESCRIPTION OF THE DRAWING

The teachings of the present invention can be readily understood by considering the following detailed description in conjunction with the accompanying drawings, in which.

DETAILED DESCRIPTION

A preferred embodiment of the invention will now be described while referring to the figures, several of which may be simultaneously referred to during the course of the following description.

Figure 1:
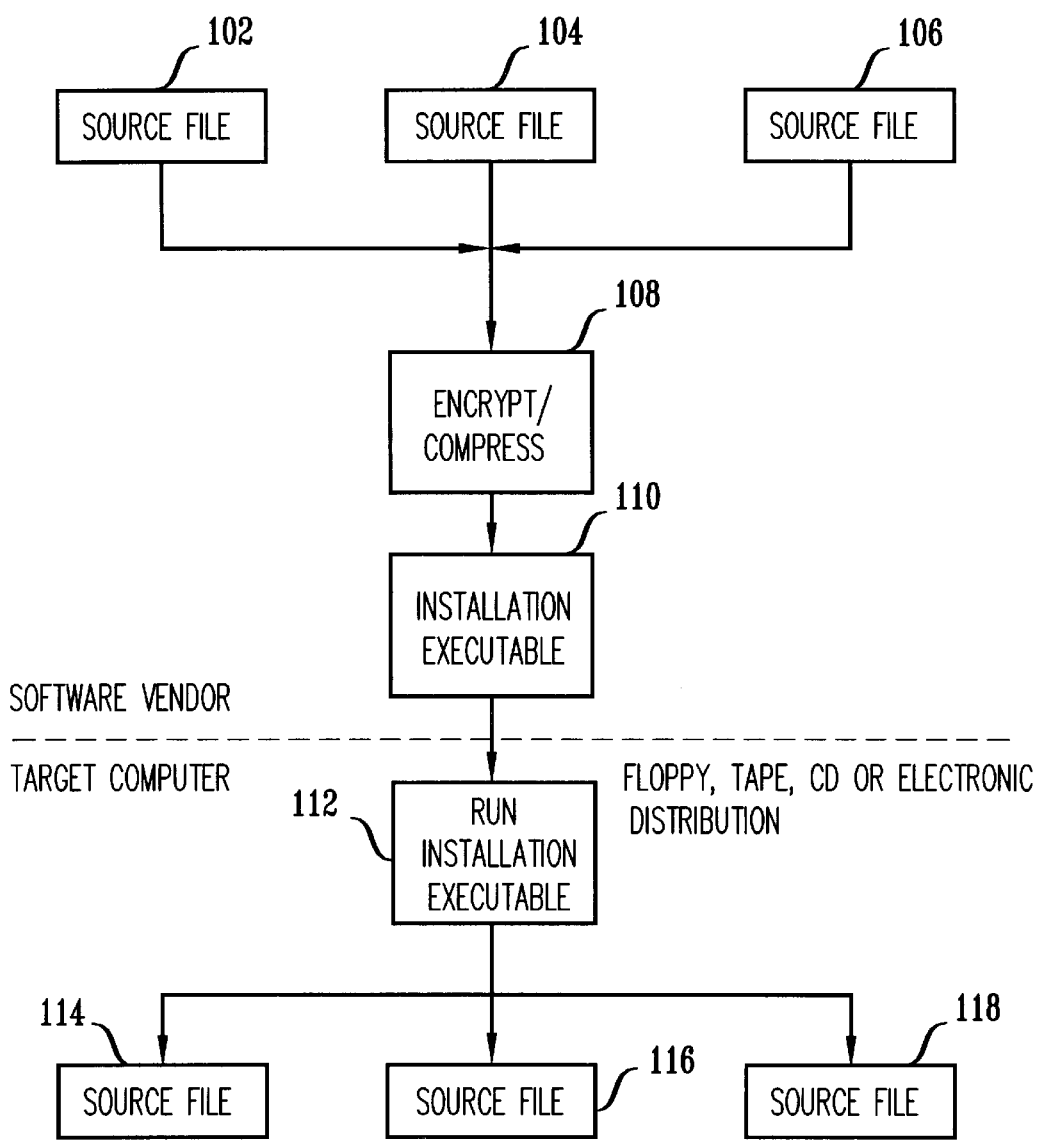
FIG. 1 is a flow diagram depicting a prior art method of computer software distribution.

With reference to FIG. 1, there it shows a flow diagram depicting prior art software distribution generally described previously. Specifically, one or more source files 102, 104 and 106 created by a software vendor are encrypted and/or compressed 108 into an installation executable file 110. As those skilled in the art will readily appreciate, any number of well known encryption/compression methods may be used either alone or in combination to act on the source files 102, 104 and 106 for subsequent incorporation into an executable file 110.

Representative installation executables such as installation executable1 10, are also well known in the art and provide a convenient "package" for subsequent distribution on a suitable medium such as floppy disk, tape, compact disc (CD) or electronic, i.e., internet to end-users of software.

Typically, the installation executable 112 is run by the end user on the target computer and through the action of the target computer executing the installation executable 112, the source files 114, 116 and 118 are decrypted/uncompressed onto the target computer.

Figure 2:
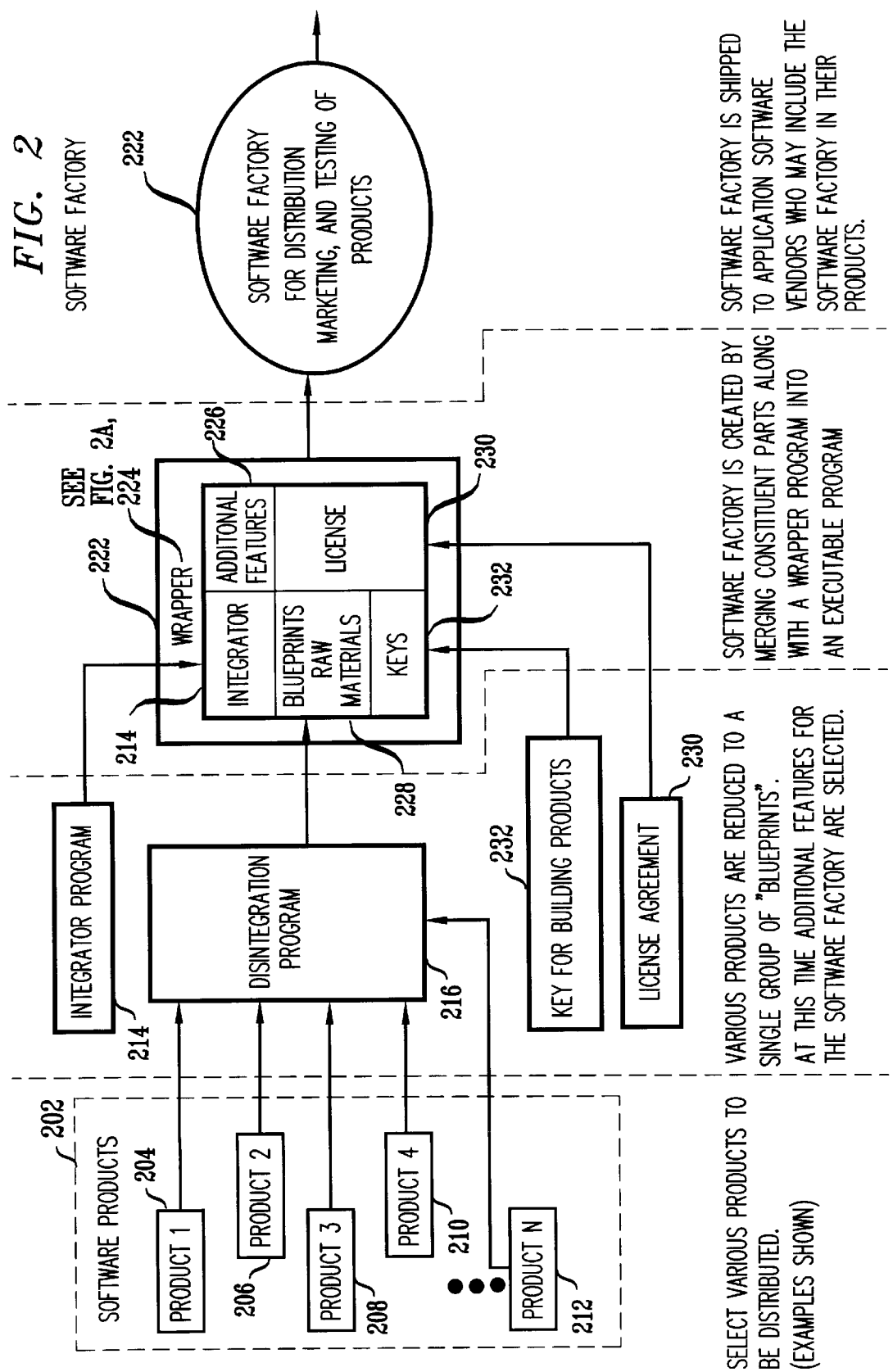
FIG. 2 shows in simplified block diagram form, a method for software distribution and accompanying software factory according to the present invention.

Turning our attention now to FIG. 2, there is shown in simplified block diagram form the subject of the present invention, namely our inventive software factory and accompanying method(s). Briefly, software product set 202 includes one or more individual software products, 204 through 212 that are reduced to component raw materials and blueprints through the action of disintegration program 216, and subsequently combined with other components into software factory 222 for eventual distribution and installation by an end user (not shown).

Specifically, software products 202 comprising one or more individual products, product-1 204 through product-N 212 are "disintegrated" through the action of disintegrator 216 into raw materials and blueprints 228 for inclusion into software factory 222. Also included into the software factory are keys 232, which provide access to various components of the software factory 222 thereby permitting or denying construction of particular products as appropriate; license(s) 230 which impart or deny certain rights associated with the particular software products during their manufacture; blueprints and raw materials 228 which are preferably produced through the action of disintegrator 216; and integrator 214 which physically manufactures the software products 202 on end user computer system. Finally, wrapper 224 packages and optionally provides mechanisms for subsequent unpackaging of the software factory components. As was used in the prior art, the wrapper 224 may be one of many known in the art, i.e., self-extracting executable wrappers.

Additional features 226 may be incorporated into the software factory prior to wrapping. In particular, additional features 226 include those features useful or desirable for end user installation, i.e., selection of product(s) to manufacture; marketing product(s) by displaying on-screen advertisements during manufacture/installation or operation; testing and/or demonstrating the products; tutorial on use of the product(s); determination of performance/system resources of end user computer system; and electronic connection to vendor site for update retrieval during manufacture. Of course, those skilled in the art will recognize that this list is not complete, and that any number additional features may be incorporated into our inventive software factory 222 as needed/desired. Once these constituent parts are packaged together, they are subsequently shipped as the software factory 222 to application software vendors or alternatively to end users.

Figure 3:
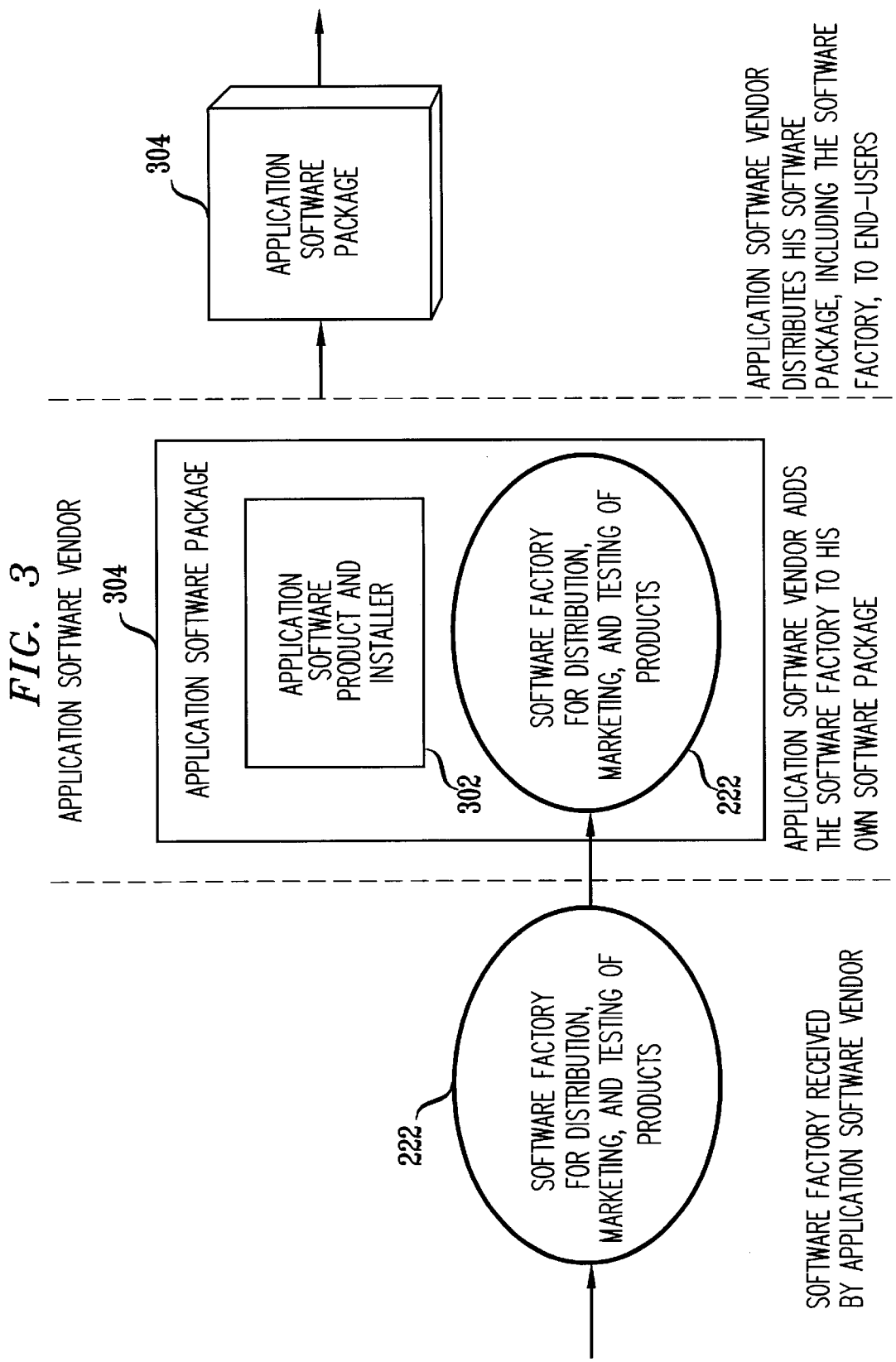
FIG. 3 shows in simplified block diagram form, software distribution from the perspective of an application software vendor according to the present invention.

With reference now to FIG. 3, the software factory 222 as originally assembled is received by an application software vendor for incorporation with that vendor's products. Specifically, an application software package 304 is constructed by the application software vendor which contains the software factory 222 and an application software product and optional installer 302. These components (the software factory 222 and software product 302) are assembled into a final application software package 304 and subsequently distributed by the application software vendor, to end users.

Figure 4:
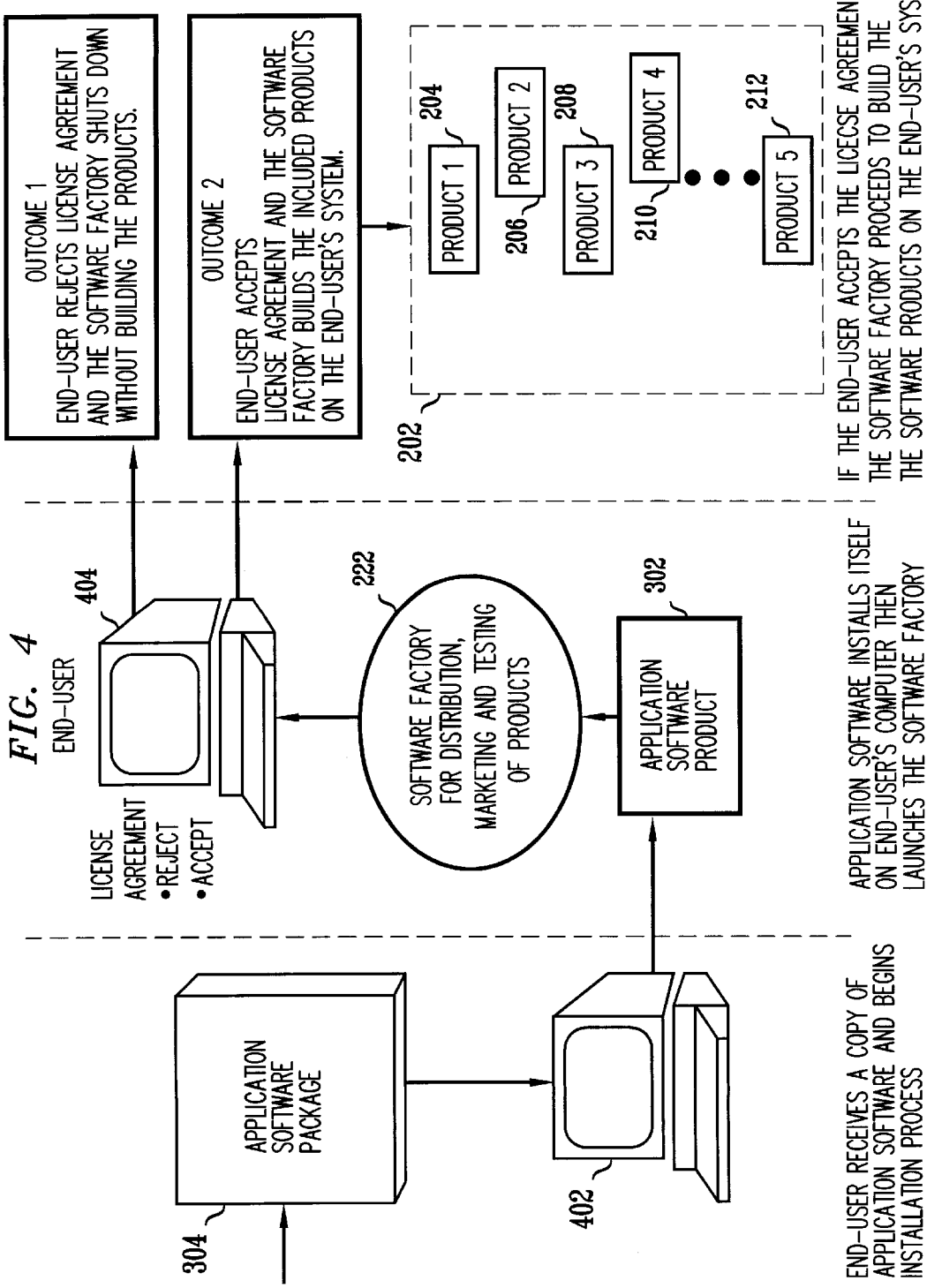
FIG. 4 shows in simplified block diagram form, software distribution from the perspective of an end user according to the present invention.

FIG. 4 depicts, in simplified block diagram form, the steps associated with the receipt of the software package 304 by an end user. In particular, the application software package 304 is received by the end user who begins an installation process on a target computer 402. In one embodiment, the application software 302 provided by the application software vendor is installed and then the software factory operation is initiated. As depicted in FIG. 4, the software factory may provide the end user with the terms associated with any license(s) 404. If the user rejects the terms of such license(s), then the software factory shuts down without manufacturing the software products (204 through 212 in FIG. 2). If on the other hand, the end user accepts the license(s), then the software factory manufactures the software products 204, 206,208,210 and 212 on the end user's target computer system.

Of course the features and functions performed by the software factory 222 is not limited to the simple licensing example described above. Specifically, prior to manufacture and subsequent to license acceptance/rejection, the software factory 222 may optionally query the end user to determine what particular software products the end user wishes to manufacture. Additionally, the software factory 222 may test the end user's target computer system to determine whether or not it meets minimum performance requirements necessary for the operation of the software products selected for installation.

As those skilled in the art will readily appreciate, the software industry is rapidly moving, and new releases or updates to software occur frequently. Consequently, software products in distribution channels are oftentimes not the most recent releases. Advantageously, the software factory 222 may electronically connect to a software vendor during the manufacture of software products 202 and determine whether or not the software products are the most recent ones available. If not, the software factory may initiate a download of any necessary blueprints and/or additional components required for manufacture and/or installation on the target computer. In this inventive manner, the end user is assured that he/she has the most recent product(s) and that they are particularly "tailored" for the target computer.

Importantly, this download feature is not limited to a single manufacture. Specifically, the software factory 222 may re-connect electronically to the software vendor at a later date to determine whether the manufactured products are the most recent/appropriate at that later date. If not, then once again any necessary blueprints and/or additional components may be retrieved and new software products may be manufactured on the target computer. In this manner, the on-going maintenance of the manufactured and installed software products is preserved.

Furthermore, the software factory 222 may advantageously test and/or demonstrate the manufactured software products after installation. A variety of well-known, "help", "demonstration" and/or "tutorial" features are easily incorporated into the software factory 222. Finally, the software factory 222 may display to the end user advertisements for complementary software products based upon the end user's target computer and its local environment. Advantageously, the advertisements may be uniquely specific to that particular end user and target system. Of course, if the end user decides that an advertised product is desirable, then the software factory 222 may optionally electronically acquire the product and subsequently install it on the target computer.

Figure 5:
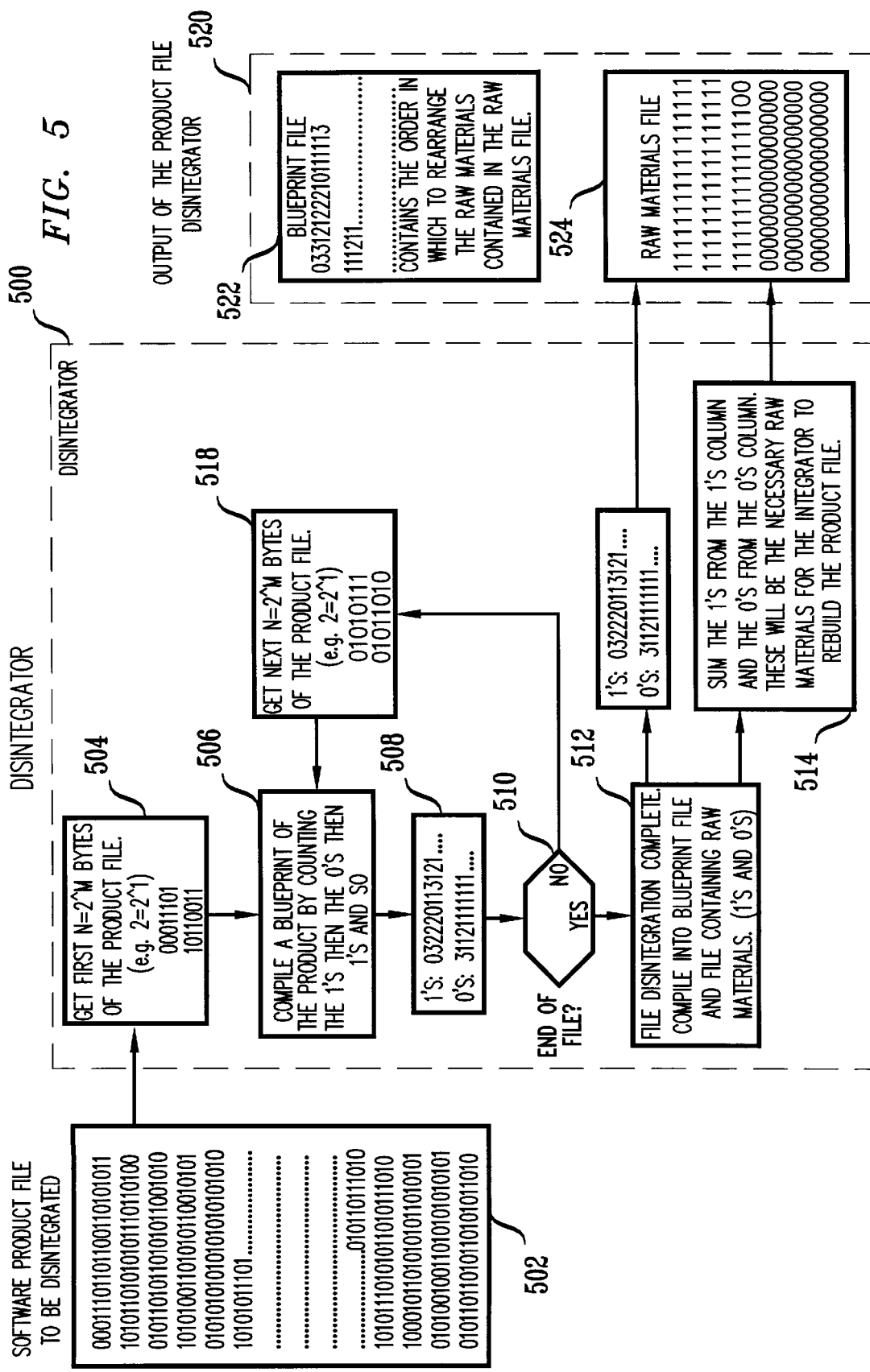
FIG. 5 is a flow diagram depicting a software disintegration method according to the present invention.

Described so far has been the overall operation of our inventive software factory. An important function of the factory, shown in FIG. 5 and FIG. 6 respectively, is the inventive disintegration and integration of software products included with the factory for manufacture. With reference now to FIG. 5, there is shown the disintegration of a software product into blueprints and raw materials for inclusion in the software factory. In particular, software product 502, which is to be disintegrated, is a collection of bits (1's and 0's) in some ordered arrangement, i.e., a file. As illustrated in FIG. 5 and shown in block 504, the first 2^M bytes of the software product file 502 are retrieved by the disintegrator 500. A blueprint of the software product file 502 is compiled, according to block 506, by counting the binary 1's and 0's contained in the software product file 502 as shown in block 508. This process is repeated, retrieving the next 2^M bytes of the software product file 518; compiling a blueprint of the software product by counting the binary 1's and 0's 506 until and end of file indicator is retrieved 510; at which time file disintegration is determined to be complete 512.

At this point in the process, the counted binary 1's and 0's are placed in a blueprint file 522 and the total number of 1's and 0's contained in the blueprint are summed 514, and the resulting numbers of 1's and 0's are placed into a raw materials file 524 that contains the binary "raw materials" necessary to regenerate the software product file 502. As shown in FIG. 5, the output of the disintegrator 500, namely the blueprint file 522 and the raw materials file 524, may advantageously be combined into a single output file 520.

Figure 6:
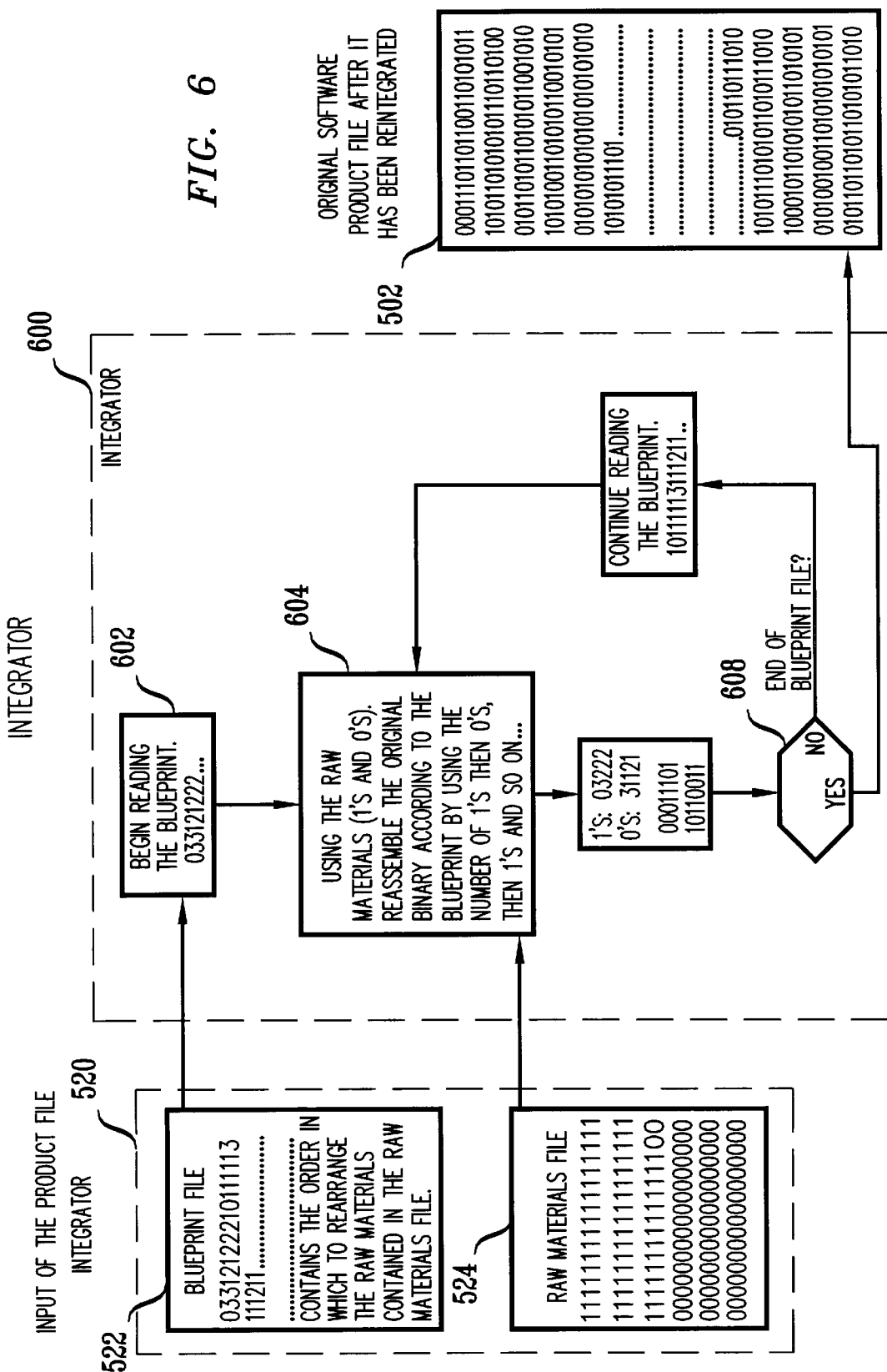
FIG. 6 is a flow diagram depicting a software integration method according to the present invention.

With reference now to FIG. 6, there is shown the process by which the original software product file 502 is regenerated from the disintegrator output file 520. Specifically, disintegrator output file 520 containing both blueprint file 522 and raw materials file 524 is input to the integrator 600, where it is utilized by the integrator 600 to reintegrate the original software product file 502. More specifically, the blueprint file 522 is read by integrator (block 602) and utilizing the binary raw materials contained in the raw materials file 524, the integrator reassembles the original binary representation of the original software product 502 (block 604). This process of reading the blueprint file 52 and reassembling the original software product 502 is continued until an end of file indicator is reached in the blueprint file (block 608). When the end of file indicator has been reached, the original software product 502 has been regenerated and may be advantageously written to a file. Advantageously, those skilled in the art will quickly recognize that the integration process utilized in our inventive software factory may exhibit a built-in check, namely the quantity of raw materials used in the integration. In particular, if the raw materials file 524 does not contain sufficient raw materials to reintegrate the original software product 502 according to the blueprint file 522, then the integrator may determine that an error exists in one or both of these files, and that an appropriate error recovery strategy is appropriate, i.e., connect to a vendor's electronic service site for download of additional materials and/or blueprints.

Additionally, such a check made during the manufacture of the software product(s) 502 advantageously permits the end user to selectively determine which software product(s) 502 are manufactured and in what quantity. In contrast, several known "anti-copying" methods employed in the prior art merely count the number of times a particular file is copied and not the quantity of raw material consumed. With our inventive method, the end user may determine that all of the raw materials are to be used, for example, to manufacture many copies of the same software product. Only when the raw materials are consumed, will the subsequent manufacture be impossible.

Figure 7:
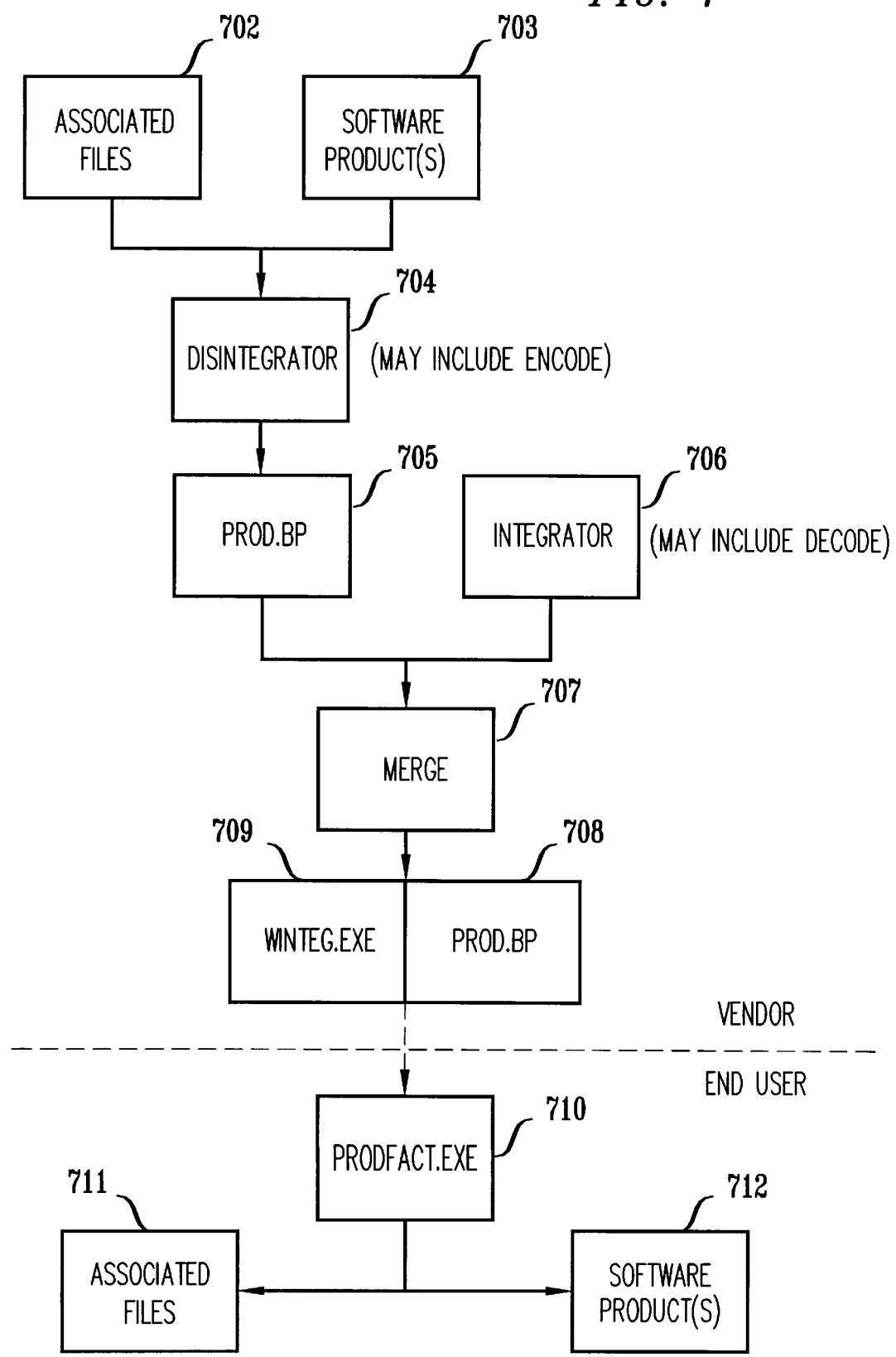
FIG. 7 is a flow diagram depicting a preferred method according to the present invention.

Turning our attention now to FIG. 7, a flow diagram depicting a preferred embodiment of the present inventive method is shown. Specifically, software products (block 703) and associated files (block 702) are disintegrated (block 704) into a set of blueprints (shown as PROD.BP in block 705). Those skilled in the art will appreciate that the raw materials used for the software products 703 and associated files 702, may optionally be included in this PROD.BP file.

The blueprints (and optional raw materials) are preferably merged with integrator (block 706) by merge program (block 707) into a single package shown in FIG. 7 as combined WINTEG.EXE (block 709) and PROD.BP (block 708). Not explicitly shown in FIG. 7, this single package may be one of many known in the art, i.e., a self-extracting executable. As depicted by the horizontal dotted line, these steps and components depicted by blocks 702–708 would typically be performed by a software vendor. Of importance, and noted in FIG. 7, disintegrator (block 704) and integrator (block 706) may optionally contain corresponding encoder/decoder or compressor/decompressor respectively (not shown). Advantageously, by utilizing such encoder/decoder combination the blueprint output by the distintegrator (block 704), namely PROD.BP (block 705) may be made suitably small for efficient transmission to an end user.

The combined WINTEG.EXE (block 709 and PROD.BP (block 708) are provided to an end user by one of a variety of means known in the art, i.e., floppy disk, CD-ROM, magnetic tape, or electronic download (FTP, WWW). Shown in FIG. 7, the combined WINTEG.EXE (block 709) and PROD.BP (block 708) have been renamed into PROD-Fact.exe (block 710). As noted previously, PRODFact.exe is preferably a self-extracting executable file which when executed on a target computer by an end user, manufactures the software product(s) (block 712) and any associated files (block 711).

Figure 8:
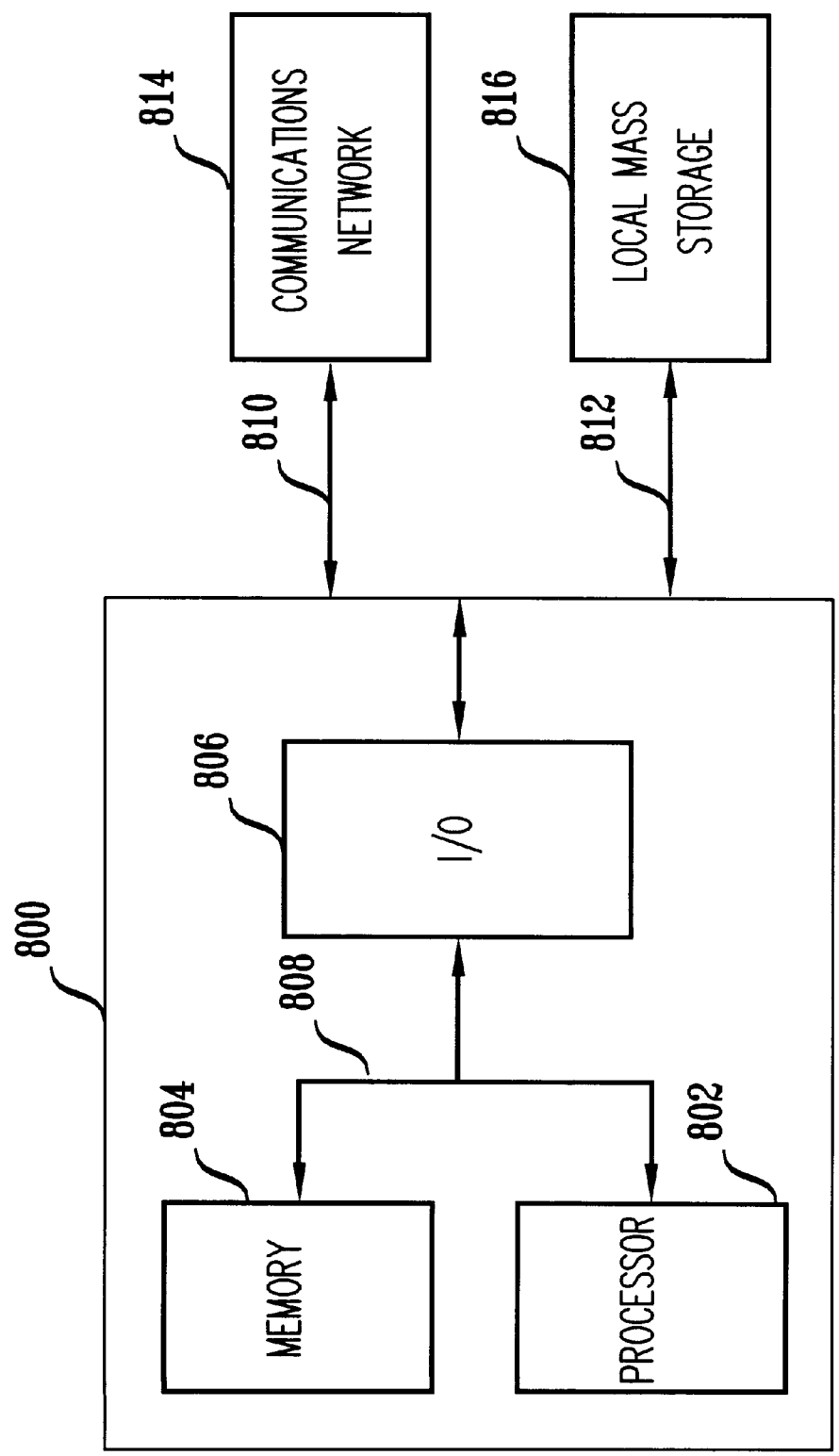
FIG. 8 shows in simplified block diagram form, an apparatus according to the present invention.

Finally, with reference now to FIG. 8, there is shown a block diagram for a computer system in which the present invention may be practiced. Specifically, computer system 800, comprises processor 802, memory 804 and input/output 806 subsystems interconnected via interconnect 808. Computer system 800 is connected to communications network 814 via communications path 810 and local mass storage system 816 via interface 812. Mass storage system 816 may be any of those known in the art such as magnetic discs or CD-ROM devices. Similarly, communications network 814 may be local or wide area network through which computer system 800 communicates to other computer systems.

While the invention has been shown and described in detail in the context of a preferred embodiment, it will be apparent to those skilled in the art that variations and modifications are possible without departing from the broad principles and spirit of the invention which should be limited solely by the scope of the claims appended hereto.

The claimed invention is:

1. A computer software distribution, installation and maintenance method comprising the steps of:

generating a set of blueprints and a set of raw materials for one or more software products by disintegrating the software product into a blueprints file and a raw materials file wherein the disintegrating includes the steps of:

retrieving, $2^M$ bytes of the software product;

compiling, a blueprint of the software product by counting binary 1's and 0's contained in the software product;

repeating, the above retrieving and compiling steps until an end of file indicator is retrieved from the software product;

compiling the blueprint into a blueprint file;

determining, from the blueprint, a quantity of raw materials necessary to rebuild the software product and;

writing that determined quantity of raw materials into a raw materials file;

providing the blueprints and raw materials to an end user; and manufacturing, on an end user target computer system, the software products described by the blueprints, using the raw materials provided wherein the manufacturing step includes the step of:

reintegrating, the software products described by the blueprint file and the raw materials file.

2. The method according to claim 1 wherein said disintegration step further comprises the step of combining the blueprint file and the raw materials file into a single, disintegrator output file.

3. The method according to claim 2 wherein said reintegration step comprises the steps of:

reading the blueprint file;

reassembling, an original binary representation of the software product using the raw materials contained in the raw materials according to the blueprint, repeating, the above reading and reassembling steps until an end of file indicator is read from the blueprint file.

4. The method according to claim 3 wherein said reintegration step further comprises the step of:

verifying, that the software product has been accurately reassembled from a quantity of raw materials used for reassembly.

5. The method according to claim 4 further comprising the step of:

determining, prior to the manufacturing, whether the target computer possesses a set of characteristics necessary for a correct operation of the software products on the target computer.

6. The method according to claim 5 further comprising the step of:

determining, prior to the manufacturing, whether the software products are most recent and if not, obtaining the most recent software products prior to the manufacturing.

7. The method according to claim 6 further comprising the step of: testing the software products subsequent to their manufacture.

8. The method according to claim 7 further comprising the step of: demonstrating the software products to the end user.

9. The method according to claim 8 further comprising the step of displaying, on the target computer, one or more advertisements for additional products.

* * * * *